United States Patent Office 3,751,378
Patented Aug. 7, 1973

3,751,378
INHIBITING PREVULCANIZATION OF RUBBER WITH POLYFUNCTIONAL METHACRYLATE MONOMERS AS CROSS-LINKING COAGENTS WITH PEROXIDES
George F. Cowperthwaite, Hatboro, John A. Cornell, Philadelphia, and John Edgar Lohr, Jr., Chester, Pa., assignors to Sartomer Industries, Inc., Essington, Pa.
No Drawing. Filed Mar. 31, 1971, Ser. No. 130,002
Int. Cl. C08f 15/18
U.S. Cl. 260—4
3 Claims

ABSTRACT OF THE DISCLOSURE

Prevulcanization of elastomer is inhibited by incorporating critical amounts of N-nitroso diphenylamine or N,N'-dinitroso-para-phenyl diphenylamine as retarder, normally 0.2-2.0% based on the parts of elastomer, in polyfunctional acrylate cross-linking monomer which is liquid at mixing temperatures and serves to plasticize the rubber and is used in amounts of about 2 to 30 parts per 100 parts of elastomer. In the presence of about 5 to 30% of the retarder in the monomer, the liquid acrylate cross-linking monomer provides long Mooney scorch time but still permits efficient cross-linking to provide superior vulcanizates as compared with straight peroxide vulcanizates. This facilitates control of vulcanization during injection molding, extrusion, compression molding and calendering.

---

This invention relates to the inhibition of the prevulcanization of polyfunctional acrylic monomers as cross-linking coagents with peroxides for the curing of natural and synthetic rubbers, the peroxide having a peroxy group between a pair of tertiary carbon atoms.

Polyfunctional acrylic liquid monomers provide significant technical advantages as reactive coagents in the cross-linking of elastomers with ditertiary organic peroxides as compared with straight peroxide vulcanization; namely, the reduction of the substantially higher amounts of peroxide which are needed to achieve complete curing and the improved processing which results because of the plasticizing effect of the liquid monomer on the rubber stock. These lead to greater curing efficiency and increase in manufacturing capacity.

Small amounts of liquid monomer are effective to produce higher hardness, lower compression set, better resistance to attack by hydrocarbon solvents, better water resistance, improved bonding to mineral fillers, improved abrasion resistance, better electrical properties, and lower cost based on increased peroxide efficiency at lower vulcanizing temperatures.

However, the two main problems which have faced the art of peroxide-coagent vulcanization are the undesirable short scorch time with shriveling and lumpiness of the cured product and the strong objectionable odor of the peroxide curing agent.

The peroxide suppliers have succeeded in reducing odor and now provide peroxide catalysts with high activity and low residual odor, these peroxides being deposited on finely divided inorganic fillers such as clay, molecular sieves and the like, or being dispersed in inert liquids. Commercially available low odor peroxides are Hercules' VW-Cup, Lucidol's Lupercol 130/XL, Noury's Triganox 29/40, and Union Carbide's Linde CW-2015.

Nevertheless, the objectionably short scorch time has not been practically improved over the past twenty years and, for this reason alone, the outstanding benefits of enhanced chemical and physical properties in the peroxide-coagent system have not been accessible to extrusion, injection molding, compression molding and sheet calendering industries. These industries require about 5 to 30 minutes for a 5-point rise of Mooney scorch time at 250° F. at the shaping station in order to provide the necessary safety margin in processing and to avoid disastrous "freezing" of the rubber stock in the mixing, curing, forming and manufacturing apparatus. The processor cannot justify the expense of special high temperature equipment for the general types of high volume products. Conventional mixers and mills for feeding simple extrusion, injection and compression molding equipment are at present fed with vulcanization recipes specifically designed for short mixing cycles and high curing rates in a short period of time, which places a heavy burden on the operating personnel and adds considerably to labor costs.

The product produced by coagent-peroxide vulcanization must be smooth, resilient, dimensionally stable and highly elastic. Scorching is characterized by rough texture, shriveling and lumpiness after extrusion and sheeting-out so that the product must be discarded. Cross-linking in the mill at low temperature results in an unacceptable product. Small manufacturing errors frequently results in complete loss of the product.

Although thousands of organic compounds are available commercially for inhibiting or retarding the rate of rubber vulcanization with sulfur curing agents or rubber accelerators and hundreds of inhibitors are known for suppressing the formation of polymer in the class of polymerizable acrylic ester monomers, in practice none of the inhibited monomers have ever been successfully used to provide a Mooney scorch time at 250° F. of as long as 10 minutes for a 5-point rise.

There have been cases reported for special rubber formulations where Mooney scorch times of about 10 minutes have been achieved, and the coagent monomer has been inhibited with quinone inhibitors. In Cornell U.S. Pat. No. 3,061,598, granted Oct. 30, 1962, one of the present inventors describes the effectiveness of hydroquinone, dimethyl cyclohexylamine and tetrahydroquinoline as inhibitor-types for the purpose of repressing the polymerization of the acrylic monomer at temperatures from 70° to 90° C. and of regulating the polymerization at a controlled uniform rate at temperatures of 100° to 110° C. However, the inhibitors, retarders and mixtures of these, as described in the above-cited prior patent, are not practical for reducing the scorch.

The present invention is based upon the surprising discovery that a Mooney scorch value of from 15 to 45 minutes for a 5-point rise may be achieved if there is added to each 10 parts of monomer coagent from about 0.3 to about 3.0 parts of either N-nitroso diarylamine or N,N'-dinitroso diphenyl-p-phenylene diamine, the monomer coagent being that needed for 100 parts of rubber, there being present from about 2 to 5 parts of ditertiary organic peroxide per part of nitroso compound. Only these two nitroso structures appear to provide the very long Mooney scorch time required for injection molding, compression molding, extrusion and calendering.

Tests carried out with a Monsanto Rheometer demonstrate outstanding characteristics for processing and mixing the rubber-peroxide coagent formulations which are to be cured at the conventional curing temperatures of about 300° to 400° F. for curing times of between 15 and 120 minutes and one minute or less.

The Mooney and the Rheometer demonstrate, for all rubber stocks responding to the rubber-peroxide coagent cure, an initial drop in viscosity, a long holding period at 250° F. of between 15 and 60 minutes, or longer from Mooney data, and a very steep rise in viscosity at 330° F., illustrating rapid cure. Cured products exhibit the excellent aging, resiliency, improved tensile values, improved solvent resistance and higher modulus values as compared with straight peroxide vulcanization.

The inventors are familiar with Parks U.S. Pat. No. 3,384,613 which describes the retardation of a straight peroxide cure by adding a ring-substituted nitroaryl compound or a ring-substituted nitrosoaryl compound, the nitrosoaryl compound being of the arylamine type. We have tried ring-substituted nitrosoaryl compounds and ring-substituted nitroaryl compounds as retarding agents for polyfunctional acrylic monomers in rubber, but have found these to be ineffective. Ineffective compounds which have been tried are 2,4-dinitrophenol, 1-chloro-2,4-dinitrobenzene, 1-nitroso-2-naphthol, and p-nitrosotoluene.

We are aware that nitrosoaryl compounds have been used in cross-linking of butyl polymers (see Alliger and Sjothun, "Vulcanization of Elastomers," Reinhold Publishing Co., 1964, pp. 264 and 265), but have found that these butyl rubber curing compounds are ineffective in aiding cross-linking by polyfunctional acrylic monomers in peroxide curing systems with rubbers other than butyl rubber. Butyl rubber cannot be cross-linked and retarded with the present coagents and retarder, nor can polyisobutylene be vulcanized.

We are also aware that N-nitrosodiphenylamine is used in combination with phenyl-β-naphthylamine and stearic acid as a retarder for the sulfenamide accelerated sulfur-vulcanization of natural rubber (see page 178 of the Alliger and Sjothun text). In contrast to the special formulation with organic acid, zinc oxide, phenyl-β-naphthylamine, etc., the present formulations in the examples below are simpler, easier to process and easier to reproduce, and they exhibit a rapid cure rate rather than a slow cure rate to provide improved vulcanized products.

Nitroso aromatic amines were tried, such as phenyl-p-nitrosophenylamine. Diphenylamine was tried and it was slightly better than p-nitroso diphenylamine, but still it was unsatisfactory. Based on this slight improvement observed with diphenylamine, phenyl-p-aminophenylamine and N,N'-diethylphenylene-diamine were tried, but both of these were totally unsatisfactory as retarding agents for the polyfunctional acrylic monomer.

Therefore, it was surprising to find that N,N'-dinitroso diphenyl-p-phenylenediamine and N-nitrosodiphenylamine were capable of achieving Mooney scorch values of 45 minutes and even up to 60 minutes or longer. In addition, other N-nitrosoarylamines substituted with alkyl, aryl, halogen, hydroxyl or hydroxy alkyl groups are active and give different scorch retarder characteristics, depending on the catalyst, rubber, accelerator and other compounding ingredients utilized. For example, N-nitroso di-tolylamine, N-nitroso di-p-chloro-phenylamine, N-nitroso di-p-hydroxylphenylamine or N,N'-dinitroso di-meta-tolyl-p-phenylenediamine can be used.

The wholly new vulcanization phenomenon of monomer-rubber-peroxide interaction is believed to be due to the critical proportions of the unique retarding agent used in the present invention which cooperates in a new way with both the monomer and the peroxide reaction products of the monomer.

The amount of retarder used in the present invention is much larger than in the case of conventional polymerization inhibitors such as hydroquinone, phenols, amines, phenolamines, and phenothiazines. These conventional polymerization inhibitors are used in monomer at levels of 60 parts per million for hydroquinone, 500 parts per million for cyclohexylamine, and 50–2000 parts per million for phenothiazine. The present nitroso-substituted amines are present in the monomer phase at a concentration which is 50 to 500 times greater than the conventional inhibitor. The normal range of the retarders is from 0.2 to 2.0 parts based on the rubber. See, for example, Cornell U.S. Pat. No. 3,061,598 for the conventional levels.

It is believed that these larger amounts of nitroso compound interact with the monomer to aid in processing the rubber substrate, but it is significant that these amounts are much lower than those employed with straight peroxide in Parks U.S. Pat. No. 3,384,613. Parks cannot achieve the improved physical and chemical characteristics afforded only by the coagent cure. Indeed, all of the rubber cures in Parks show that scorch retardation is achieved at the expense of physical characteristics, e.g. the cures without retarder demonstrate superior physical properties over the cures with retarders.

In contrast, the present system supplies improved physical properties of the cured product without resort to special additives, fillers and receipes, the improvement being due to the unique retarder and its critical amounts which unexpectedly provide the combination of processing advantages and curing advantages resulting from the interaction with the polyfunctional monomer coagent at its maximum efficiency.

Representative ditertiary peroxides which effectively cure in about 20 to 60 minutes at 300–350° F. under standard rubber processing conditions are ditertiary-butyl peroxide, ditertiary-amyl peroxide, 2,2-di-(tertiary-butyl-peroxy) butane, di-(alpha, alpha-dimethylbenzyl) peroxide, known as dicumyl peroxide, di-(alpha, alpha-dimethyl-p-chlorobenzyl) peroxide, di-(alpha, alpha-dimethyl-2,4-dichlorobenzyl) peroxide, and tertiarybutyl-1-methylcyclohexyl peroxide.

Elastomers vulcanized in accordance with the coagent-peroxide cure and retarding agent include natural rubber, synthetic rubbers and vinyl elastomers. The synthetic rubbers include:

Polybutadiene
Styrene-butadiene
Acrylonitrile-butadiene
Acrylonitrile-butadiene-styrene
Styrene-acrylonitrile
Ethylene-propylene
Urethane
Acrylate
Ethylene-propylene-diene
Chlorinated polyethylene
Chlorosulfonated polyethylene
Fluorinated polyethylene
Polyisoprene
Polychloroprene
Silicone The vinyl or ethylene elastomers include vinyl acetate-vinyl chloride copolymer, vinyl alkyl ether polymers, polyethylene, polyethylene-methacrylic acid, and mixtures of these which have been successfully vulcanized with peroxide and monomer coagent heretofore.

With all of these rubbers, the peroxide level is kept at the lowest level consistent with the improvement desired in tensile strength, modulus, elongation and compression set. The polyfunctional monomer is generally used in a proportion to provide the maximum viscosity reduction consistent with the desirable mixing properties and the desirable physical properties. Unless special hardening is desired, no more than about 20 parts of monomer per hundred parts of rubber is added and generally 2 to 15 parts of monomer is preferred.

In contrast to the usual experience with hydroquinone which scorches severely, the present retarding agent in the monomer provides long scorch time, even at high levels of the monomer of the order of 50 parts per 100 parts of rubber.

The polyfunctional acrylate liquid monomer coagents fall within a limited group, are all liquid at 100° F. which is the temperature of mixing or compounding, and are listed below:

Trimethylol propane trimethacrylate, pentaerythritol tetramethacrylate, glycerol trimethacrylate, glycerol triacrylate, trimethylol propane triacrylate, pentaerythritol tetra-acrylate, trimethylol ethane trimethacrylate, trimethylol ethane triacrylate, 1,3-butylene glycol dimethacrylate, ethylene glycol dimethacrylate, 1,3-butylene glycol diacrylate, 1,4-butylene glycol dimethacrylate, and polyethylene glycol 200 dimethacrylate.

EXAMPLE 1

High level of monomer

This example illustrates, for the recipe below and the curing conditions shown, a high level of monomer at 10 parts per hundred which provides a Mooney scorch time in excess of 30 minutes at 250° F. This Mooney scorch time is the value for a 5-point rise of Mooney viscosity at the testing temperature of 250° F.

| Ingredient: | Parts by weight |
|---|---|
| Hycar 1042 (NBR rubber) | 100 |
| FEF (carbon black) | 40 |
| Zinc oxide | 5 |
| Dicup 40C (dicumyl peroxide 40% on clay) | 6 |
| SR-350G (trimethylol propane trimethacrylate containing 10% N-nitroso diphenylamine) | 10 |

The physical properties obtained were substantially improved over those of the original unretarded monomer containing 4 parts Dicup which had poor scorch. The curing cycles were for 15, 30 and 45 minutes at 320° F. The values for percent elongation were better than for the same recipe from which N-nitroso diphenylamine was absent.

The improvement in processing which was made possible because of the remarkably long Mooney scorch time permitted wire and cable extrusion which could not have been carried out in standard extruding machinery with a recipe from which the scorch retarding agent was absent.

EXAMPLE 2

Low level of monomer

This example illustrates a change from 1 part per hundred of scorch retarding agent at 10 parts per hundred of monomer in Example 1 to 0.4 part per hundred of scorch retarding agent at 4 parts per hundred of monomer based upon NBR rubber in the recipe.

| Ingredient: | Parts by weight |
|---|---|
| Hycar 1042 (NBR rubber) | 100 |
| FEF (carbon black) | 40 |
| Zinc oxide | 5 |
| Dicup 40C (dicumyl peroxide 40% on clay) | 6 |
| SR-350G (trimethylol propane trimethacrylate containing 10% N-nitroso diphenylamine) | 4 |

The scorch time for a 5-point rise in Mooney viscosity at 250° F. was more than 30 minutes. The cures at 320° F. and 15, 30 and 45 minutes provided tensile values, modulus values and hardness values which matched the cures achieved in the absence of the scorch retarding agent, but improved elongation values were obtained.

EXAMPLE 3

EPR formulation

This example illustrates the peroxide vulcanization of ethylene-propylene copolymer rubber with ethylene glycol dimethacrylate monomer in the presence of the same scorch retarding agent as used in Examples 1 and 2.

| Ingredient: | Parts by weight |
|---|---|
| Enjay EPR 404 (EPR) | 100 |
| Calcined clay | 125 |
| EPC black | 10 |
| Petrolatum | 5 |
| Luperco 130XL (43% of 3.5.dimethyl 2.5. (dibutylperoxy) hexane-3 on an inert filler) | 3 |
| SR-206G (ethylene glycol dimethacrylate) (containing 10% N - nitroso diphenylamine) | 10 |

| | Parts by weight |
|---|---|
| Cured 15 min. at 177° C. | |
| Tensile strength (kg./cm.$^2$) | 55 |
| Modulus at 100% (kg./cm.$^2$) | 25 |
| Elongation (percent) | 300 |
| Hardness (Shore A) | 60 |

The Mooney scorch time for a 5-point rise at 250° F. was upwards of 30 minutes.

EXAMPLE 4

This example illustrates the cure of SBR rubber to high Shore A Hardness values utilizing the scorch retarding agent of the present invention. Attention is invited to page 104 of the above-mentioned Alliger and Sjothun text which illustrates the increase in Shore A Hardness value with increase of time of cure. The present example illustrates a marked increase in physical properties, including hardness, tensile strength and elongation at break, with the increase of cure time from 5 to 20 minutes. These curing cycles of 5, 10 and 20 minutes make the composition of this example especially useful in high production extrusion coating where previous curing times have been from 60 to 160 minutes (see Alliger and Sjothun, page 105).

SBR RUBBER FORMULATION

| Ingredient: | Part by weight |
|---|---|
| Polysar Krylene N (SBR) | 100 |
| Zinc oxide | 5 |
| Stearic acid | 1 |
| Agerite Resin D (antioxidant) | 1.5 |
| FT carbon black | 130 |
| SR-297P (1,3 - butylene glycol (dimethacrylate) | 20 |
| N-nitroso diphenylamine | 0.6 |
| Dicup 40C (dicumyl peroxide 40% on clay) | 2 |

Compound properties:

Compound viscosity (MI-4 at 212° F.) _____ 30
Mooney scorch time (min. at 257° F.) _____ 60+

UNAGED VULCANIZATE PROPERTIES
[Cured at 330° F.]

| Property: | Mins. cured | Value |
|---|---|---|
| Hardness, Shore A$_2$ | 10 | 89 |
| | 20 | 90 |
| | 40 | 91 |
| Tensile strength (p.s.i.) | 5 | 1,900 |
| | 10 | 2,140 |
| | 20 | 2,000 |
| | 40 | 3,250 |
| Elongation at break (percent) | 5 | 50 |
| | 10 | 40 |
| | 20 | 30 |
| | 40 | 30 |

EXAMPLE 5

Urethane formulation

This example shows a urethane rubber formulation which has a long Mooney scorch time of about 30 minutes and which cures in the press in about 2 minutes.

| Ingredient: | Parts by weight |
|---|---|
| E 395 Thiokol Rubber Co. (urethane rubber) | 100 |
| TiO$_2$ | 15 |
| HiSil 233 (silica filler) | 5 |
| Dicup 40C (dicumyl peroxide 40% on clay) | 3 |
| SR-206 (ethylene glycol dimethacrylate) | 3 |
| N,N'-dinitroso diphenyl-p-phenylene diamine | 0.2 |

This was press cured at 310° F. for 2 minutes and gave a satisfactory cure having a tensile strength of 1750 p.s.i. and 300% elongation.

EXAMPLE 6

Neoprene formulation

This example illustrates a rapid cure for neoprene rubber which provides excellent tensile strength and is especially useful for wire and cable extrusion.

| Ingredient: | Part by weight |
| --- | --- |
| Neoprene WRT | 100 |
| Dixier 45 (GPF) (dry filler) | 70 |
| Agerite Powder (PBN) (antioxidant) | 2 |
| Light calcined MgO | 4 |
| SR-350 (trimethylol propane trimethacrylate) | 20 |
| N-nitroso-diphenylamine | 0.6 |
| Varox[2,5 bis(t-butyl peroxy)-2,5-dimethyl hexane on clay in a strength of 50%] | 5 |

The cure at 153° C. for 20 minutes gave a tensile strength of 2505 p.s.i.; for 30 minutes, a tensile strength of 2340 p.s.i.; and for 40 minutes, a tensile strength of 2355 p.s.i.

EXAMPLE 7

Polybutadiene formulation

This example illustrates a cis-butadiene polymer especially useful for high production compression molding.

| Ingredient: | Parts by weight |
| --- | --- |
| Highly resilient polybutadiene | 100.00 |
| SR-350 (trimethylol propane trimethacrylate) (containing 2% N-nitroso diphenylamine) | 45.00 |
| HiSil (silica filler) | 30.00 |
| Dicup 40C (dicumyl peroxide 40% on clay) | 3.75 |
| TiO$_2$ | 6.00 |
| Ultramarine Blue | .01 |

This material molded well and was completely cured in 15 minutes at 320° F.

We claim:

1. In a curable rubber composition comprising:
    (a) a peroxide-curable elastomer selected from the group consisting of natural rubber, polybutadiene, styrene-butadiene, acrylonitrile-butadiene-styrene, styrene-acrylonitrile, ethylene-propylene, urethane, acrylate, ethylene-propylene-diene, chlorinated polyethylene, chlorosulfonated polyethylene, polyethylene, ethylene-methacrylic acid copolymer, polyisoprene, polychloroprene, and silicone;
    (b) a ditertiary organic peroxide for curing said elastomer in from about 20 to 60 minutes at 300-350° F.; and
    (c) a polyfunctional acrylate liquid monomer coagent which reacts with said ditertiary peroxide to crosslink said elastomer and thereby produce higher hardness, lower compression set, better resistance to solvents, and improved abrasion resistance as compared to peroxide curing of said elastomer in the absence of said acrylate coagent;

that improvement consisting of incorporating a pre-vulcanization inhibitor which retards the premature polymerization of said liquid polyfunctional acrylate cross-linking agent at mixing temperatures of (a), (b) and (c) above and provides long Mooney scorch time to facilitate dimensionally accurate, reproducible and more efficient vulcanization in injection molding, extrusion, compression molding and calendering, said inhibitor being selected from the group consisting of N-nitroso diphenylamine, N,N'-dinitroso-p-phenyl diphenylamine, N-nitroso, ditolylamine, N-nitroso-di-p-chloro phenylamine, N-nitroso-di-p-hydroxyl phenylamine, and N,N'-dinitroso di-meta-tolyl-p-phenylene diamine, there being present from about 0.2–2.0% of said inhibitor based upon the weight of said elastomer.

2. A curable rubber composition as claimed in claim 1, wherein said elastomer is natural rubber.

3. A curable rubber composition as claimed in claim 1, wherein said polyfunctional acrylate liquid monomer coagent is selected from the group consisting of trimethylol propane trimethacrylate, pentaerythritol tetra-methacrylate, glycerol trimethacrylate, glycerol triacrylate, trimethylol propane triacrylate, pentaerythritol tetra-acrylate, trimethylol ethane trimethacrylate, trimethylol ethane triacrylate, 1,3-butylene glycol dimethacrylate, ethylene glycol dimethacrylate, 1,3-butylene glycol diacrylate, 1,4-butylene glycol dimethacrylate, and polyethylene glycol 200 dimethacrylate.

References Cited

UNITED STATES PATENTS

| | | | |
| --- | --- | --- | --- |
| 3,528,936 | 9/1970 | Kent et al. | 260—879 |
| 3,427,274 | 2/1969 | Cornell | 260—879 |
| 3,502,338 | 3/1970 | Cox | 260—879 |
| 3,427,264 | 2/1969 | Forster et al. | 260—4 R |
| 3,478,132 | 11/1969 | Randolph | 260—4 R |
| 3,384,613 | 5/1968 | Parks | 260—45.9 R |

JOHN C. BLEUTGE, Primary Examiner

U.S. Cl. X.R.

260—41.5 R, 41.5 A, 827, 859 R, 878 R, 879, 881, 884, 885

UNITED STATES PATENT OFFICE
CERTIFICATE OF CORRECTION

Patent No. 3,751,378             Dated August 7, 1973

Inventor(s) George F. Cowperthwaite et al

It is certified that error appears in the above-identified patent and that said Letters Patent are hereby corrected as shown below:

Column 4, line 27, delete "and vinyl elastomers";

line 34, delete "styrene-acrylonitrile";

lines 45 - 50, delete these lines entirely.

Claim 1, Column 7, lines 42 and 43, delete "styrene-acrylonitrile".

Signed and sealed this 2nd day of April 1974.

(SEAL)
Attest:

EDWARD M. FLETCHER, JR.
Attesting Officer

C. MARSHALL DANN
Commissioner of Patents